Oct. 12, 1948.  R. C. SANDERS, JR  2,450,991
RADAR CONTROL SYSTEM
Filed May 4, 1944  2 Sheets-Sheet 1
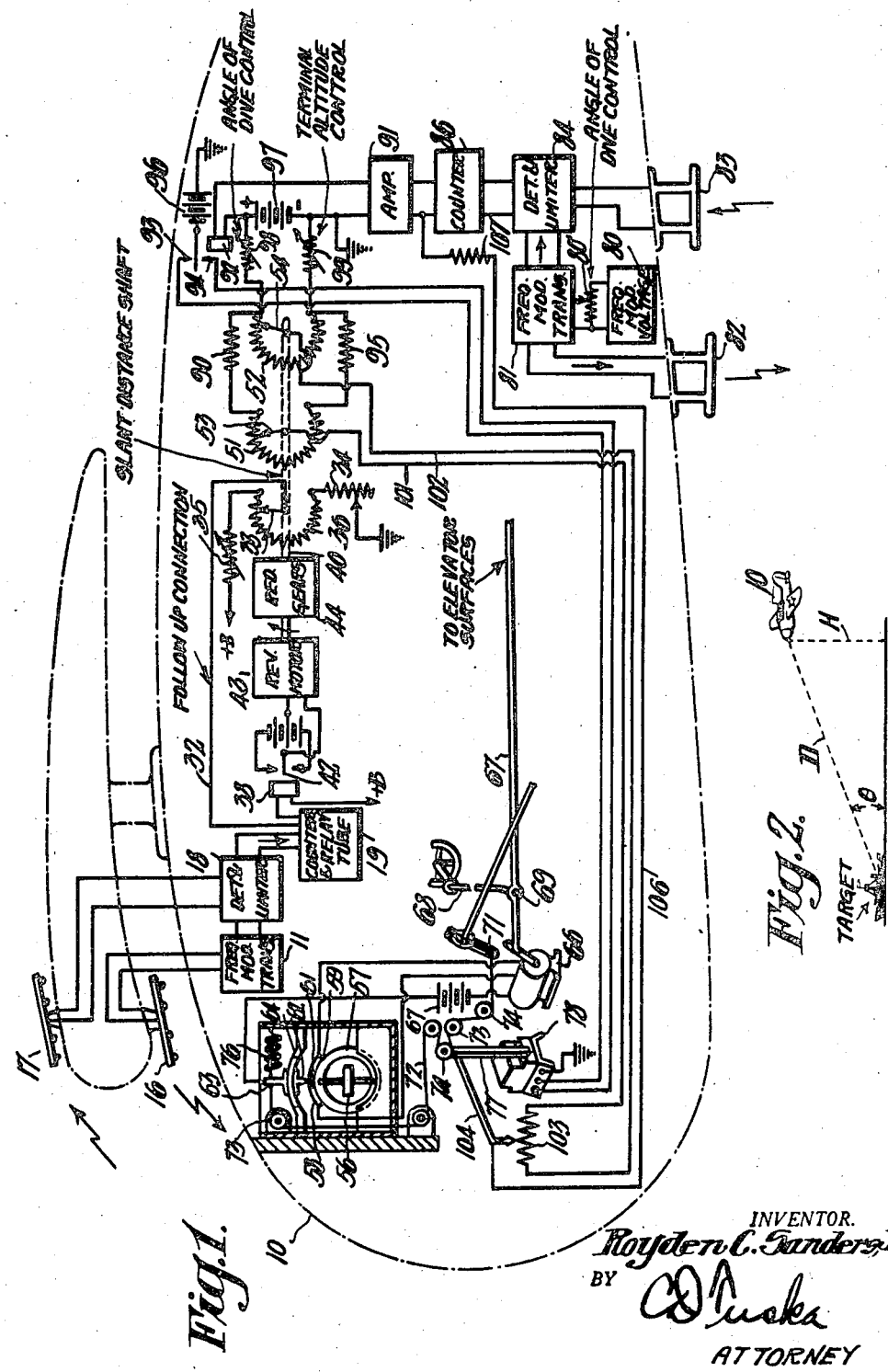
INVENTOR.
Royden C. Sanders, Jr.
BY
ATTORNEY

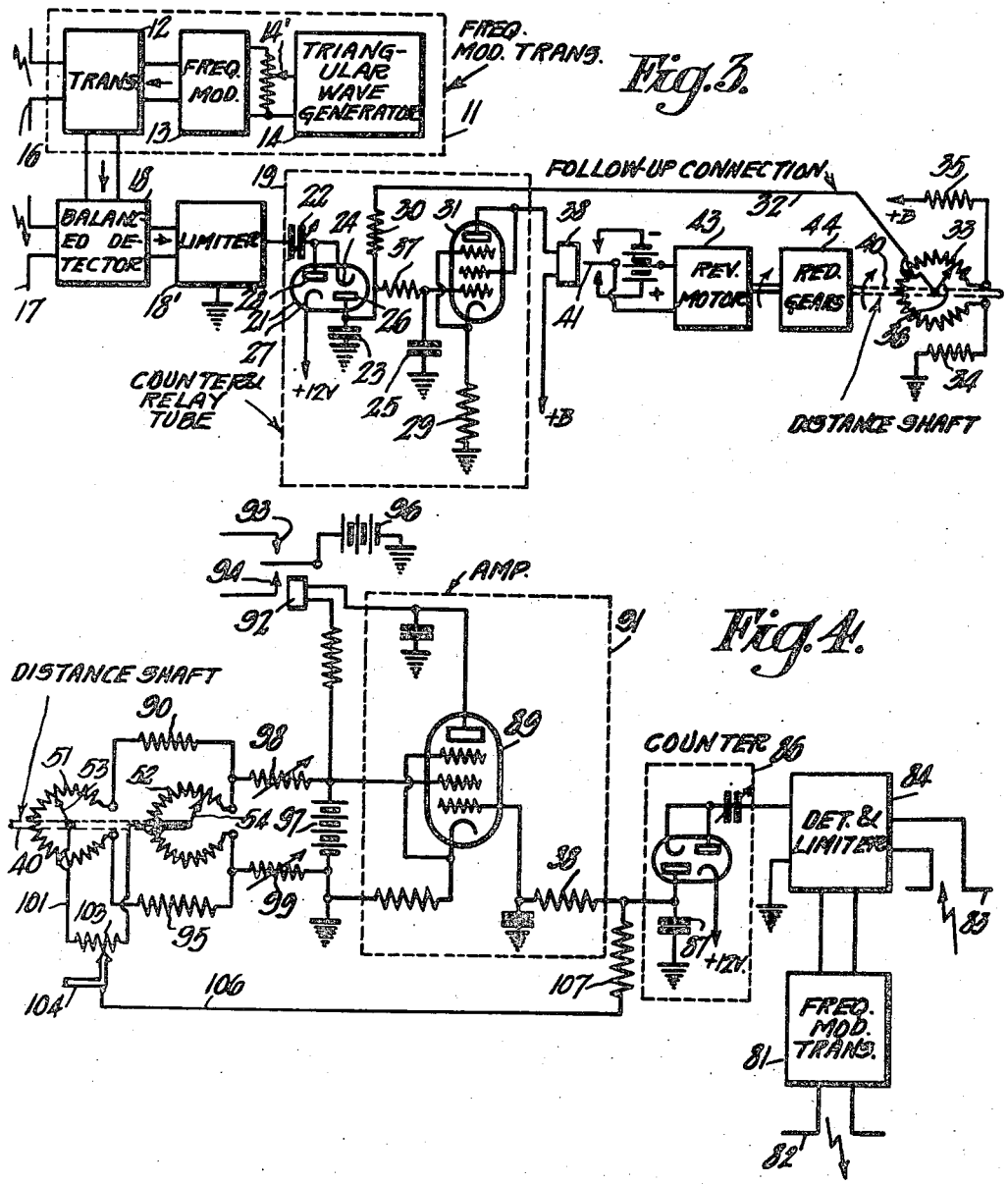

Patented Oct. 12, 1948

2,450,991

UNITED STATES PATENT OFFICE 2,450,991

RADAR CONTROL SYSTEM

Royden C. Sanders, Jr., Hightstown, N. J., assignor to Radio Corporation of America, a corporation of Delaware Application May 4, 1944, Serial No. 534,108

16 Claims. (Cl. 343—7)

My invention relates to the automatic control of an object in flight and particularly to the use of a reflected radio signal for directing a dirigible air-borne device such as an aircraft or aerial torpedo along a predetermined downward path toward an enemy ship or other target.

One object of the invention is to provide an improved method of and means for flying a bomb loaded dirigible air-borne device such as an aircraft or an aerial torpedo into a target.

Another object of the invention is to provide an improved method of and means for automatically directing an object in flight along a predetermined downward path toward a signal reflecting object.

According to a preferred embodiment of the invention, the aircraft or flying torpedo is made to fly toward a target with a constant angle of approach. This may be accomplished by employing a radio altimeter for determining the altitude and by employing a radio distance determining system for determining the slant distance to the target. Altitude control means is provided for decreasing the altitude of the aircraft or torpedo in response to a decrease in the slant distance to the target. The altitude control means may comprise a motor that is controlled by the distance information, the motor being mechanically coupled through reduction gears to a movable voltage divider tap of a follow-up circuit whereby the angular position of the reduction gear shaft (and the position of the movable tap) represent distance to the target. The reduction gear shaft, which is referred to as the "distance" shaft, is connected to a pair of movable taps of a voltage divider control system which preferably is of the type including a gyrostabilizer. Such an altimeter and gyrostabilizer system is described and claimed in a copending application Serial No. 484,458, filed April 24, 1943, by Royden C. Sanders, Jr. and John H. Purl, now Patent No. 2,443,748, issued June 22, 1948, and entitled Aircraft control system.

In the particular system described hereinafter the "distance" shaft moves the altitude limit control elements (the above-mentioned pair of taps) in the altimeter to make the gyrostabilizer change the elevator controls and fly the aircraft or torpedo to a lower level. The system is so designed that hunting of the aircraft or torpedo about the desired altitude level is avoided.

The left-right control system for making the aircraft or torpedo fly toward the target may be of the type wherein left-right directive antennas having overlapping radiation patterns are switched for radiating a frequency modulated radio signal successively therefrom. Such a system is described and claimed in my copending application Serial No. 527,292, filed March 20, 1944, and entitled Comparator circuits for radio locators.

The invention will be better understood from the following description taken in connection with the accompanying drawing in which Figure 1 is a circuit and block diagram of one embodiment of the invention as applied to an aircraft or torpedo, Figure 2 is a diagram that is referred to in explaining the invention, Figure 3 is a circuit and block diagram of the apparatus used in the system of Fig. 1 for obtaining slant distance information, and Figure 4 is at circuit and block diagram of the apparatus used in Fig. 1 for obtaining altitude information.

Fig. 1 shows that the invention applied to a dirigible air-borne device 10 such as an airplane, a drone, a glider, or torpedo, which is controllable in flight. The invention will be described as applied to a drone or flying torpedo that is to be flown with a bomb load into an enemy ship. Thus, as shown in Fig. 2, the aircraft 10 is flown automatically along a path D into the target. The path D may always be at a fixed angle $\theta$ to the earth's surface as indicated in Fig. 2, or the angle $\theta$ may be made to change as the aircraft approaches the target. In any case, according to the present invention, the elevation control of the aircraft is responsive to means for measuring the slant distance from aircraft to target (the distance along path D) so that the altitude H of the aircraft is reduced as the target is approached or $H = k_1 D + k_2$ where $k_1$ and $k_2$ are constants.

The apparatus for measuring the slant distance from aircraft to target will first be described with reference to Figs. 1 and 3. It comprises a frequency-modulated radio transmitter unit 11 that includes a radio transmitter 12, a frequency modulating unit 13 and a modulating wave generator 14 which, in the present example, generates a triangular wave for producing a linear frequency modulation of the transmitted radio wave. The band width of the frequency-modulation sweep may be changed by adjusting a variable tap 14'. This may be used as the maximum distance control. The radio wave is radiated forwardly and downwardly from a directional antenna 16 which may be of the Yagi type mounted on the underside of the wing.

The frequency-modulated signal reflected from the target is received by a similar directive antenna 17 and supplied to a detector 18 where it heterodynes with the frequency-modulated signal supplied directly from the transmitter 12 to produce a beat signal at audio frequency. Since the beat signal frequency depends upon the radio propagation time to the target, it is a measure of the slant distance. The beat signal is passed through an amplitude limiter 18' and the resulting square wave signal is applied to a frequency counter and cathode follower circuit 19.

The counter preferably comprises a pair of oppositely connected diodes in a common envelope 21 to which the square wave is applied through a capacitor 22 of comparatively small capacity. A storage capacitor 23 of comparatively large capacity has a charge supplied to it through the cathode 24 and anode 26 of one diode upon the occurrence of each negative half cycle of the square wave. Since the capacitor 22 is small enough to reach full charge shortly after the beginning of a square wave half cycle, the storage capacitor 23 is charged up a fixed additional amount each time a negative half cycle occurs whereby the voltage thereacross is proportional to the beat frequency, and, therefore, to distance.

The diode comprising a cathode 27 and an anode 28 is provided to discharge the capacitor 22 at the end of each negative half cycle to prevent it from blocking. The cathode 27 is connected to a positive bias such as 12 volts.

The storage capacitor 23 is provided with a leakage path to ground through a resistor 30 and a conductor 32, a portion of a voltage divider resistor 33 and a voltage divider resistor 34. The voltage drop across this portion of the voltage divider provides a counter bias voltage on the anode 26. The capacitor 23 will reach an equilibrium voltage for a given applied beat frequency, assuming the counter bias voltage and the resistance of the leakage path are not changed. In the present invention, counter bias voltage, and incidentally the leakage path resistance, are changed by means of a motor driven variable tap 36 on the resistor 33 as will be explained hereinafter. The high potential end of resistor 33 is connected to a positive D.-C. voltage source through a resistor 35.

The distance indicating voltage appearing across capacitor 23 is applied through a protective resistor 37 to the control grid of an amplifier tube 31. A filter capacitor 25 may be connected between the grid of tube 31 and ground, if desired. The cathode of the tube 31 is connected through a cathode bias resistor 29 to ground. The anode circuit of the tube 31 includes a relay 38 having an armature 41 to control a reversible motor 43. When the motor 43 rotates, it drives a slant distance shaft 40 through the reduction gears 44 to move the tap 36 along resistor 33, thereby changing the voltage applied to the capacitor 23 through the lead 32. As will be explained below, the motor 43 will rotate until the shaft 40 from the reduction gear unit 44 (and the tap 36) assumes a position corresponding to the distance from the aircraft 10 to the target. As the aircraft 10 approaches the target, the shaft 40, and the tap 36 coupled to it, will move continuously to indicate the slant distance continuously. It is this "distance" shaft 40 that is utilized to change the altitude limit controls of the aircraft 10 to reduce its altitude as the target is approached.

In operation, as the aircraft approaches the target, the beat frequency output from detector 18 decreases and the voltage across the storage capacitor 23 decreases whereby the relay 38 is actuated to drive the motor in the direction for moving the tap 36 toward the grounded end of resistor 33, thus decreasing the positive voltage applied to the capacitor 23. If the beat frequency remained at some reduced frequency value, equilibrium would be reached and the motor would stop. In the example assumed, the motor 43 will continue to move the tap 36 since the distance is being continually reduced. If the motor 43 moves the tap 36 too fast, the voltage across the storage capacitor 23 will start to increase because of too little positive voltage applied through the lead 32 and the motor 43 will be either stopped or reversed momentarily to make the necessary correction in the said positive voltage. It will be apparent that the angular position of the shaft 40 will indicate the slant distance to the target at all times.

The altitude control apparatus and the means by which it is controlled by the distance shaft 40 will now be described with reference to Figs. 1 and 4. Before describing this portion of the system in detail, attention is directed to the fact that, as shown in Fig. 1, the radio altimeter includes two voltage divider resistors 51 and 52 having movable taps 53 and 54, respectively, that are driven by the distance shaft 40. Instead of the two resistors 51 and 52 in parallel, a single resistor with the taps 53 and 54 angularly spaced thereon might be substituted. As will be apparent from the description that follows, the positions of the taps 53 and 54 control the altitude of the aircraft. As the distance shaft 40 turns to a position representing less distance to the target, it moves the taps 53 and 54 to positions that reduce the altitude of the aircraft.

Referring to Fig. 1, an automatic pilot mechanism of known construction is provided, connected to the elevator control surfaces of an airplane. The automatic pilot includes a longitudinal attitude control gyroscope 56 provided with a gimbal ring 57, carrying two conducting sectors 58 and 59 separated by a small insulating sector 61. A contact 62, engaging either the sector 61 or one of the conducting sectors 58 and 59, is on the end of a lever 63 adjacent to the ring 57. The lever 63, which is of conducting material is slidably mounted in an arcuate slot of a supporting member 64 so that the contact 62 will be guided in an arcuate path about the sectors 58, 59 and 61. The sectors 58 and 59 are connected to a reversible motor 66, and the contact 62 is connected through the lever 63 to one terminal of a D.-C. source 67, the other terminal of which is connected to the motor 66. The shaft of the motor 66 is mechanically coupled through a linkage 67 to the elevator surfaces (not shown) of the airplane.

The control stick 68 of the airplane is connected at a pivot 69 to the control linkage, and through an arm 71 to a cable 72. The cable 72 is guided over a plurality of pulleys 73 and a pulley 74 and connected to the lever 63 carrying the contact 62. A spring 76 is provided to maintain the cable 72 under tension. The pulley 74 is supported at the end of a lever 77 secured to the shaft of a reversible motor 78.

Neglecting temporarily the effect of operating the motor 78, the operation of the system thus far described is as follows: The gyroscope 56 tends to maintain a constant attitude, with its rotor in a plane parallel to the surface of the earth. The movable contact 62 normally engages the insulating sector 61. Any deviation of the airplane from level flight will move the contact 62 with respect to the ring 57, and into contact with either the sector 58 or the sector 59. Thus the motor 66 will be energized so as to run in the proper direction to adjust the elevator control surfaces to cause the airplane to resume its attitude for level flight. In moving to adjust the control surface, the motor 66 also moves the cable 71, rotating the contact 62 with respect to the longitudinal axis of the craft. When the contact 62 reaches the insulated sector 61, the motor is deenergized. During this time the control surfaces have been bringing the aircraft back toward the position of level flight. As the airplane continues toward its normal attitude, the contact 62, which has been displaced ahead of the gyroscope, passes the insulated sector and engages the opposite conducting sector, causing the motor 66 to run in the reverse direction. This returns the control surfaces toward the position for a level flight. Thus the applied control is removed as the airplane is returning to its normal attitude, so that the control surface will be back in its neutral or central position when the disturbance has been corrected. Briefly, a follow-up action has been applied to control the aircraft's attitude as a function of the gyro control.

In order to maintain flight along the desired path D, a radio altimeter similar to that described in Civil Aeronautics Bulletin No. 29, on pages 86–90, may be used to actuate the automatic pilot to change the attitude of the airplane for bringing it successively to the altitudes selected by the distance shaft 40, thus causing it to descend along the desired path. The altimeter is also similar to the distance determining system previously described, except for the follow-up control.

The altimeter comprises a frequency-modulated transmitter 81 that radiates the signal downwardly from an antenna 82. The modulating wave, which may be triangular, for example, is supplied from a suitable source 80. The amplitude of the applied modulating wave may be adjusted by a movable tap 80' to change the band width of the frequency sweep and thereby adjust the angle of dive. The reflected signal is received by an antenna 83 and supplied to a detector 84 where it beats with the frequency-modulated signal supplied directly from the transmitter 81 to produce an audio signal having a beat frequency that corresponds to the altitude H (Fig. 2) of the aircraft 10.

The beat frequency signal is supplied to a frequency counter 86 which may be of the same type as the counter 19 previously described. The voltage appearing across the storage capacitor 87 of the counter 86 is applied through a resistor 88 to the control grid of an amplifier tube 89 comprising the amplifier 91. The actuating coil of a relay 92 is connected in the anode circuit of the tube 89. The relay 92 is provided with contacts 93 and 94 which are arranged to connect the motor 78 to a D. C. source 96 for forward and reverse operation, respectively. The D. C. operating voltage for the anode of the tube 89 is indicated at 97.

The voltage divider resistor 52 is connected across the D. C. source 97 through the variable resistors 98 and 99. The voltage divider resistor 51 is connected across the resistor 52 through resistors 90 and 95. The rotatable arms carrying the taps 53 and 54 are mechanically connected to the distance shaft 40 as indicated. They are angularly spaced apart from each other by a fixed amount and are held in this spaced relation as they are rotated by the shaft 40. The taps 53 and 54 are connected through leads 101 and 102 to a potentiometer 103 which is provided with a movable arm 104. The arm 104 is connected through a lead 106 and a resistor 107 to the control grid circuit of the amplifier tube so that the voltage at the potentiometer arm 104 opposes the output of the counter 86.

In operation the magnitude of the counter output decreases with decrease in frequency, and hence with decrease in altitude. The D. C. control voltage derived from the voltage dividers 51 and 52 through the taps 53 and 54 and the potentiometer 103 is opposed to the output of the counter 86. The control voltage is adjusted by moving the contacts 53 and 54 to a magnitude equal to that produced by the counter at the selected altitude. The movable contact of the relay 92 is actuated to its upper or lower position depending on whether the counter output is less or greater than the control voltage, thus energizing the motor 78 to move the pulley 74, displacing the contact 62 from the level flight position, and causing the airplane elevator controls to be positioned for either ascent or descent.

The motor 78 also moves the contact arm 104 of the potentiometer 103, changing the control voltage applied to the altitude limit relay circuit and thus changing the altitude to which the airplane tends to fly. The lever 77 and the potentiometer arm 104 are normally centered. When the airplane departs from the selected level, the relay 92 operates to start the motor 78 moving to change the position of the pulley 74. This moves the contact 62 with respect to the gimbal ring 57, operating the motor 66 to change the flight attitude so as to return the airplane to the selected level.

Motion of the motor 78 also moves the arm of the potentiometer 103, changing the control voltage to a value corresponding to an altitude between the selected altitude and the present altitude. As the airplane leaves this intermediate altitude, the relay 92 is operated to reverse the motor 78, returning the potentiometer arm and the contact 62 to their normal centered positions. The mechanical control ratios between the motor 78, the pulley 74 and the potentiometer arm 103 are such that the contact 62 is centered when the craft reaches the selected altitude. This arrangement is necessary in order to prevent the airplane from approaching the selected altitude in a climbing or diving attitude and overshooting the proper altitude.

If preferred, my invention may be practiced by utilizing an "altimeter shaft" instead of a "slant-distance shaft" to maintain the desired ratio of altitude to slant distance. This method of control may be utilized merely by connecting the leads from the antennas 82 and 83 to the transmitter 11 and detector 18, respectively and by connecting the leads from the antennas 16 and 17 to the transmitter 81 and the detector 84, respectively. In operation, the elevator surfaces will be actuated just as in the first embodiment either to increase or decrease the altitude of the airplane if the angle θ is incorrect.

Thus the invention has been described as a system for automatically controlling the flight of a dirigible air-borne device along a descending path toward a signal reflecting object or target, and particularly as a system for causing an aircraft or torpedo to home on and fly into or close to a target to bomb or torpedo it.

I claim as my invention:

1. A control system for a dirigible air-borne device comprising distance measuring means for measuring altitude, distance measuring means for measuring the slant distance to a point on the earth's surface, and means responsive to a change in the ratio of said altitude and slant distance measurements for causing a decrease in said altitude as said slant distance decreases.

2. A control system for a dirigible air-borne device comprising distance measuring means for measuring altitude, distance measuring means for measuring the slant distance to a point on the earth's surface, means actuated by one of said distance measuring means to make said device go to an altitude selected by an adjustment of said one measuring means, means for changing said adjustment of said one measuring means in response to a change in a predetermined relation of said altitude measurement with respect to said slant distance measurement for causing a decrease in said altitude as said slant distance decreases in accordance with said predetermined relation.

3. A control system for a dirigible air-borne device comprising distance measuring means for measuring altitude, distance measuring means for measuring the slant distance to a point on the earth's surface, control means for making said device go to an altitude selected by an adjustment thereof, and means including a follow-up circuit for one of said distance measuring means for changing the altitude adjustment of said control means in response to a change in the ratio of altitude and slant distance measurements for causing a decrease in said altitude as said slant distance decreases.

4. A control system for a dirigible air-borne device comprising distance measuring means for measuring altitude, distance measuring means for measuring the slant distance to a point on the earth's surface, means actuated by one of said distance measuring means to make said device go to an altitude selected by an adjustment of said one measuring means, and means including a follow-up circuit for one of said distance measuring means for changing said adjustment of said one distance measuring means in response to a change in the ratio of altitude and slant distance measurements for causing a decrease in said altitude as said slant distance decreases.

5. A control system for a dirigible air-borne device comprising gyrostabilizer means for controlling the attitude of said device, distance measuring means for measuring altitude, distance measuring means for obtaining an indication of the slant distance to a point on the earth's surface, means actuated by one of said distance measuring means for controlling said gyrostabilizer means to make said device go to an altitude selected by an adjustment of said one distance measuring means, and means for changing said adjustment of said one distance measuring means in response to a change in the ratio of said altitude and slant distance measurements for causing a decrease in said altitude as said distance decreases.

6. A control system for a dirigible air-borne device comprising an altimeter, means actuated by said altimeter to make said device go to an altitude selected by an adjustment of said altimeter, distance measuring means for obtaining an indication of the distance to a point on the earth's surface, and means for changing said adjustment of said altimeter in response to a change in said distance indication for causing a decrease in said altitude as said distance decreases.

7. A control system for a dirigible air-borne device comprising gyrostabilizer means for controlling the attitude of said device, an altimeter, means actuated by said altimeter for controlling said gyrostabilizer means to make said device go to an altitude selected by an adjustment of said altimeter, distance measuring means for obtaining an indication of the distance to a point on the earth's surface, and means for changing said adjustment of said altimeter in response to a change in said distance indication for causing a decrease in said altitude as said distance decreases.

8. A control system for a dirigible air-borne device comprising gyrostabilizer means for controlling the attitude of said device, a radio altimeter, means actuated by said altimeter for controlling said gyrostabilizer means to make said device go to an altitude selected by an adjustment of said altimeter, a radio distance measuring means for obtaining an indication of the distance to a target, and means for changing said adjustment of said altimeter in response to a change in said distance indication for causing a decrease in said altitude as said distance decreases to fly said device into said target.

9. A control system for a dirigible air-borne device comprising an altimeter, means actuated by said altimeter to make said device go to an altitude selected by an adjustment of said altimeter, distance measuring means for obtaining an indication of the distance to a point on the earth's surface, and means including a follow-up circuit for said distance measuring means for changing said adjustment of said altimeter in response to a change in said distance indication for causing a decrease in said altitude as said distance decreases.

10. A control system in a dirigible air-borne device having an elevator control surface, said control system comprising a distance determining system of the type that comprises means for transmitting a cyclically frequency-modulated radio wave toward a wave reflecting object, that further comprises a receiver for receiving the wave after reflection from said object and to which said modulated wave is supplied as a heterodyning signal, said receiver including beat frequency responsive means for producing a signal output that is a predetermined function of the distance to said object, a reversible motor, means for controlling the direction of rotation of said motor in accordance with the signal output of said frequency responsive means, and follow-up means operated by said motor for holding the signal output of said frequency responsive means substantially constant as the distance to said object changes whereby the amount of angular rotation of said motor is a predetermined function of said distance, said control system also comprising an attitude control means including a pitch gyroscope, servo means controlled by said gyroscope and connected to said elevator control surface, means for varying the bias of said gyroscope to vary the attitude of said craft, an altimeter, an altimeter follow-up motor controlled by the output signal of said altimeter and connected to be rotated in one direction or the other in response to a change in altitude of said air-borne device above or below predetermined altitude limits, mechanical connections between said altimeter follow-up motor and said gyroscope bias control means to superimpose on said gyroscope bias an additional bias that is a predetermined function of the amount of angular rotation of said altimeter follow-up motor, and means responsive to the amount of angular rotation of said altimeter follow-up motor for changing the output signal of said altimeter in a sense tending to stop the rotation of said altimeter follow-up motor, and means responsive to the amount of angular rotation of said distance indicating motor for changing the output signal of said altimeter in the sense corresponding to a decrease in altitude as said distance to the wave reflecting object decreases.

11. A control system in a dirigible air-borne device having an elevator control system, said control system comprising a distance determining system of the type that comprises means for transmitting a cyclically frequency-modulated radio wave toward a wave reflecting object, that further comprises a receiver for receiving the wave after reflection from said object and including a beat detector, an amplitude limiter, and a frequency counter connected in cascade in the order named and that further comprises means for supplying said modulated wave as a heterodyning signal to said detector directly from said transmitter, a reversible motor, means for controlling the direction of rotation of said motor in accordance with the output signal of said counter, and means operated by said motor for holding the signal output of said counter substantially constant as the distance to said object changes whereby the amount of angular rotation of said motor is a predetermined function of said distance, said control system also comprising an attitude control means including a pitch gyroscope, servo means controlled by said gyroscope and connected to said elevator control surface, means for varying the bias of said gyroscope to vary the attitude of said craft, an altimeter, an altimeter follow-up motor controlled by the output signal of said altimeter and connected to be rotated in one direction or the other in response to a change in altitude of said air-borne device above or below predetermined altitude limits for a given altimeter adjustment, mechanical connections between said altimeter follow-up motor and said gyroscope bias control means to superimpose on said gyroscope bias an additional bias that is a predetermined function of the amount of angular rotation of said altimeter follow-up motor, and means responsive to the amount of angular rotation of said altimeter follow-up motor for changing the output signal of said altimeter in a sense tending to stop the rotation of said altimeter follow-up motor, and means responsive to the amount of angular rotation of said distance indicating motor for changing the output signal of said altimeter in the sense corresponding to a decrease in altitude as said distance to the wave reflecting object decreases.

12. In a system for flying a dirigible air-borne device toward a target at a constant angle of approach, means for determining the slant distance to said target, said means comprising a frequency counter comprising a coupling capacitor of comparatively small capacity, a rectifier and a storage capacitor of comparatively large capacity all connected in series with each other, means for applying to said series circuit a square wave of constant maximum amplitude having a frequency that is a predetermined function of said distance whereby said larger capacitor may receive a charge during the half-wave cycles of one polarity, a rectifier connected to said smaller capacitor in a direction opposite to that of the other rectifier for discharging said smaller capacitor during the half-wave cycles of the other polarity, frequency-counter biasing means for applying to the junction point of said first rectifier and said larger capacitor a bias voltage of a polarity to oppose the flow of rectified current through said larger capacitor, a reversible motor having an armature, means for controlling the direction of movement of said armature in accordance with the charge on said larger capacitor, and means for controlling said bias voltage in accordance with the amount of movement of said armature and with the change in bias in the direction that tends to stop the movement of said armature, said frequency-counter biasing means comprising a voltage divider resistor having a movable tap thereon from which said bias voltage is taken, and a direct-current source connected across said voltage divider.

13. A control system in a dirigible air-borne device having an elevator control surface, said control system comprising an altimeter of the type that comprises means for transmitting a cyclically frequency-modulated radio wave toward the earth's surface, that further comprises a receiver for receiving the wave after reflection from said surface and to which said modulated wave is supplied as a heterodyning signal, said receiver including a beat frequency counter for producing a signal output that is a predetermined function of said altitude, voltage biasing means for said counter for adjusting the magnitude of said output corresponding to a predetermined altitude, a follow-up motor controlled by the signal output of said altimeter and connected to be rotated in one direction or the other in response to a change in altitude of said air-borne device above or below predetermined altitude limits for a given voltage bias on said counter, and means responsive to the amount of angular rotation of said follow-up motor for changing said counter bias and the resulting signal output of said altimeter in a sense tending to stop the rotation of said follow-up motor, means for obtaining an indication of the distance to a target, and means responsive to said distance indication for changing said counter bias in the sense corresponding to a decrease in altitude as said distance to the target decreases, and means connected to said elevator control surface for controlling the altitude of said air-borne device in accordance with the amount of angular rotation of said follow-up motor.

14. A control system carried by a dirigible airborne device that is to travel along a predetermined glide path, said system comprising a distance measuring means for measuring altitude, distance measuring means for obtaining an indication of the distance to a signal reflecting surface, means actuated by one of said distance measuring means to make said air-borne device go to an altitude selected by an adjustment of said one measuring means, means for changing said adjustment of said one measuring means in response to a change in the distance measurement of the other measuring means so that said airborne device travels along said glide path.

15. A control system carried by a dirigible airborne device that is to travel along a predetermined glide path, said system comprising a radio altimeter, means actuated by said altimeter to make said air-borne device go to an altitude selected by an adjustment of said altimeter, distance measuring means for obtaining an indication of the distance to a signal reflecting surface, means for making said adjustment of said altimeter, and means for changing said adjustment of said altimeter in response to a change in said distance indication so that said air-borne device travels along said glide path.

16. A control system carried by a dirigible airborne device that is to travel along a predetermined glide path, said system comprising a radio altimeter, distance measuring means for obtaining an indication of the distance to a signal reflecting surface, means actuated by said distance measuring means to make said air-borne device go to an altitude selected by an adjustment of said distance measuring means, means for making said adjustment of said distance measuring means, and means for changing said adjustment of said distance measuring means in response to a change in said altitude so that said air-borne device travels along said glide path.

ROYDEN C. SANDERS, Jr.

REFERENCES CITED

The following references are of record in the file of this patent:

UNITED STATES PATENTS

| Number | Name | Date |
| --- | --- | --- |
| 2,176,469 | Moueix | Oct. 17, 1939 |
| 2,349,370 | Orner | May 23, 1944 |